US012686202B2

(12) United States Patent　　　　　(10) Patent No.:　US 12,686,202 B2
Kim et al.　　　　　　　　　　　　　(45) Date of Patent:　　　Jul. 21, 2026

---

(54) ROLL-TO-ROLL GLASS LAMINATION SYSTEM AND METHOD OF LAMINATING GLASS

(71) Applicant: CORNING INCORPORATED, Corning, NY (US)

(72) Inventors: EuiHo Kim, Asan-si (KR); ChaHyun Ku, Gumi-si (KR)

(73) Assignee: CORNING INCORPORATED, Corning, NY (US)

(*) Notice: Subject to any disclaimer, the term of this patent is extended or adjusted under 35 U.S.C. 154(b) by 9 days.

(21) Appl. No.: 18/685,069

(22) PCT Filed: Aug. 10, 2022

(86) PCT No.: PCT/US2022/039890
§ 371 (c)(1),
(2) Date: Feb. 20, 2024

(87) PCT Pub. No.: WO2023/027891
PCT Pub. Date: Mar. 2, 2023

(65) Prior Publication Data
US 2024/0375392 A1　　　Nov. 14, 2024

(30) Foreign Application Priority Data
Aug. 24, 2021　(KR) ........................ 10-2021-0111886

(51) Int. Cl.
*B32B 37/10*　　　(2006.01)
*B32B 37/00*　　　(2006.01)
(Continued)

(52) U.S. Cl.
CPC .......... *B32B 37/10* (2013.01); *B32B 37/0053* (2013.01); *B32B 37/203* (2013.01); (Continued)

(58) Field of Classification Search
CPC ............ B32B 17/10; B32B 2037/1072; B32B 37/003; B32B 37/0046; B32B 37/0053;
(Continued)

(56) References Cited

U.S. PATENT DOCUMENTS 9,656,901 B2　　5/2017　Mitsugi et al.
9,963,374 B2　　5/2018　Jouanno et al.
(Continued)

FOREIGN PATENT DOCUMENTS

JP　　2006-266351 A　　10/2006
KR　　10-1287825 B1　　7/2013
(Continued)

OTHER PUBLICATIONS

International Search Report and Written Opinion of the International Searching Authority; PCT/US2022/039890; dated Nov. 25, 2022; 10 pages; European Patent Office.
(Continued)

*Primary Examiner* — Sonya M Sengupta
(74) *Attorney, Agent, or Firm* — John P. McGroarty

(57) ABSTRACT

A roll-to-roll glass lamination system includes: a glass unwinding unit configured to unwind a glass ribbon from a glass roll; a film feeding unit configured to unwind the film from a film roll; a lamination unit configured to laminate the film on the glass ribbon to create a laminate, the lamination unit including an air injection device configured to blow air onto a second surface of the glass ribbon in a lamination space such that the first surface of the glass ribbon is in contact with the film; and a laminate winding unit configured to wind the laminate.

18 Claims, 9 Drawing Sheets

(51) Int. Cl.
  *B32B 37/20* (2006.01)
  *B32B 38/00* (2006.01)
  *C03C 27/10* (2006.01)
(52) U.S. Cl.
  CPC .......... *B32B 38/0004* (2013.01); *C03C 27/10*
    (2013.01); *B32B 2037/1072* (2013.01)
(58) Field of Classification Search
  CPC ......... B32B 37/06; B32B 37/10; B32B 37/12;
    B32B 37/203; B32B 38/0004; B32B
    38/10; C03C 27/10
  See application file for complete search history.

(56)                References Cited

U.S. PATENT DOCUMENTS

| | | | |
|---|---|---|---|
| 2013/0133809 A1 | 5/2013 | Kondo | |
| 2019/0276351 A1 | 9/2019 | Inagaki et al. | |
| 2021/0178705 A1* | 6/2021 | Inagaki | B32B 37/10 |
| 2024/0375392 A1* | 11/2024 | Kim | B32B 17/10 |

FOREIGN PATENT DOCUMENTS

| | | |
|---|---|---|
| KR | 10-2016-0003706 A | 1/2016 |
| KR | 10-2017-0082783 A | 7/2017 |
| KR | 10-2019-0058558 A | 5/2019 |

OTHER PUBLICATIONS

Korean Patent Application No. 10-2021-0111886, Office Action dated Mar. 27, 2026, 8 pages (English Translation only), Korean Patent Office.

\* cited by examiner

ROLL-TO-ROLL GLASS LAMINATION SYSTEM AND METHOD OF LAMINATING GLASS

CROSS-REFERENCE TO RELATED APPLICATIONS

This application claims the benefit of priority under 35 U.S.C. § 371 of International Application No. PCT/US2022/0398900, filed on Aug. 10, 2022, which claims the benefit of priority under 35 U.S.C. § 119 of Korean Patent Application Serial No. 10-2021-0111886 filed on Aug. 24, 2021, the content of each of which is relied upon and incorporated herein by reference in its entirety.

BACKGROUND

Field

One or more embodiments relates to a roll-to-roll glass lamination system and a glass lamination method using the system, and more particularly, to a roll-to-roll glass lamination system operated to laminate a film on a glass roll by using a continuous processing method, and a glass lamination method using the system.

Description of the Related Art

Glass having a small thickness can be bendable and flexible. Glass that is bendable and flexible may be used as a material for flexible displays, wearable electronic devices, or for the interior or exterior of buildings. Such flexible glass may be wound into a roll and stored and transported in the form of glass rolls. However, when a continuous processing method is performed on a glass roll, due to the fragile characteristics of glass, the glass is prone to damage.

SUMMARY

One or more embodiments include a roll-to-roll glass lamination system for laminating a film on a glass ribbon in a continuous manner, and a method of laminating a film on a glass ribbon by using the system.

Additional aspects will be set forth in part in the description which follows and, in part, will be apparent from the description, or may be learned by practice of the presented embodiments of the disclosure.

According to one or more embodiments, a roll-to-roll glass lamination system includes: a glass unwinding unit configured to unwind a glass ribbon from a glass roll, the glass ribbon having a first surface and a second surface; a film feeding unit configured to unwind the film from a film roll; a lamination unit configured to laminate the film on the first surface of the glass ribbon to create a laminate, the lamination unit including an air injection device configured to blow air onto the second surface of the glass ribbon in a lamination space such that the first surface of the glass ribbon is in contact with the film; and a laminate winding unit configured to wind the laminate into a laminate roll.

The air injection device may be configured such that air having a predetermined pressure is injected downward through a plurality of injection holes, and the lamination unit may be configured such that the glass ribbon passes through the lamination space under the air injection device while the second surface of the glass ribbon faces the air injection device and the first surface of the glass ribbon faces the film.

The air injection device may include an air injection surface on which the plurality of injection holes are randomly distributed, wherein the air injection surface has a first width along a moving direction of the glass ribbon, the air injection surface has a first length along a direction transverse to the moving direction of the glass ribbon, the first width is in a range from 20 mm to 300 mm, and the first length is in a range from 300 mm to 2000 mm.

The lamination unit may be configured such that a first pressure higher than atmospheric pressure is applied onto the second surface of the glass ribbon over an entire area of the air injection surface within the lamination space.

Each of the plurality of injection holes may have a size in the range of 10 to 100 micrometers.

The air injection device may include a porous material plate, and the porous material plate may include at least one from carbon, aluminum, polyethylene resin, silica, and a metal alloy.

The lamination unit may further include a nip roller detachably arranged downstream of the air injection device along a movement path of the glass ribbon, and the lamination unit may be configured such that the laminate passes through the nip roller.

The film feeding unit may include: a film unwinder configured to unwind the film from the film roll; a liner film peeling portion configured to separate a liner film adhered to an adhesive surface of the film from the film; and a liner film winder configured to wind the liner film separated from the film in the liner film peeling portion.

The roll-to-roll glass lamination system may further include a film cutting unit arranged upstream of the lamination unit along a movement path of the film supplied to the lamination unit, the film cutting unit including: a sensing portion configured to sense a position of an end portion of the glass ribbon; a cutting portion configured to cut the film at a position corresponding to the position of the end portion of the glass ribbon; and a holding portion configured to hold both ends of the cut film to maintain a tension of the cut film until an end portion of the film approaches the end portion of the glass ribbon.

The roll-to-roll glass lamination system may further include a pre-heating unit arranged upstream of the lamination unit along a movement path of the glass ribbon and configured to heat the glass ribbon to a predetermined temperature.

The film may include a pressure-sensitive adhesive (PSA) film, an optically clear adhesive (OCA) film, a decoration film, a self-adhesive film, or a combination thereof.

According to one or more embodiments, a roll-to-roll glass lamination system for lamination of a film onto a glass ribbon, includes: a glass unwinding unit configured to unwind the glass ribbon from an initial glass roll; a film feeding unit configured to unwind the film from a film roll; a lamination unit configured to laminate the film on a first surface of the glass ribbon in a non-contact manner to create a laminate, the lamination unit including an air injection device configured to blow an pressurized air onto a second surface of the glass ribbon, opposite to the first surface of the glass ribbon, in a lamination space; and a laminate winding unit configured to wind the laminate into a laminate roll.

The air injection device may be configured such that the pressurized air is injected downward through a plurality of injection holes, and the lamination unit may be configured such that the film entering the lamination space is positioned below the first surface of the glass ribbon.

The air injection device may include an air injection surface on which the plurality of injection holes are randomly distributed, wherein the air injection surface has a first width along a moving direction of the glass ribbon, the air injection surface has a first length along a direction transverse to the moving direction of the glass ribbon, the first width is in a range from 20 mm to 300 mm, and the first length is in a range from 300 mm to 2000 mm.

The lamination unit may further include a nip roller detachably arranged downstream of the air injection device along a movement path of the glass ribbon, and the lamination unit may be configured such that the laminate passes through the nip roller.

The film feeding unit may include: a film unwinder configured to unwind the film from the film roll; a liner film peeling portion configured to separate a liner film adhered to an adhesive surface of the film from the film; and a liner film winder configured to wind the liner film separated from the film in the liner film peeling portion.

The roll-to-roll glass lamination system may further include a film cutting unit arranged upstream of the lamination unit along a movement path of the film supplied to the lamination unit, the film cutting unit including: a sensing portion configured to sense a position of an end portion of the glass ribbon; a cutting portion configured to cut the film at a position corresponding to the position of the end portion of the glass ribbon; and a holding portion configured to hold both ends of the cut film to maintain a tension of the cut film until an end portion of the film enters the lamination space.

The roll-to-roll glass lamination system may further include a pre-heating unit arranged upstream of the lamination unit along a movement path of the glass ribbon and configured to heat the glass ribbon to a temperature in a range of 40° C. to 100° C.

A roll-to-roll glass lamination method according to one or more embodiments of the present disclosure includes a roll-to-roll glass lamination method for laminating a film on a glass ribbon using the roll-to-roll glass lamination system according to the embodiments. According to one or more embodiments, the method includes: feeding the glass ribbon from the glass unwinding unit to the lamination space; feeding the film from the film feeding unit to the lamination space, the film being arranged adjacent to the first surface of the glass ribbon; laminating the film on the first surface of the glass ribbon within the lamination space to create a laminate, by injecting a pressurized air onto the second surface of the glass ribbon from the air injection device; and winding the laminate into a laminate roll using the laminate winding unit.

The method may further include subsequent to the laminating the film on the first surface of the glass ribbon, applying a pressing pressure to the laminate using the nip roller.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is a schematic view illustrating a roll-to-roll glass lamination system according to other embodiments;

FIG. 8 is a schematic view illustrating a roll-to-roll glass lamination system according to other embodiments;

DETAILED DESCRIPTION

Figure 1:
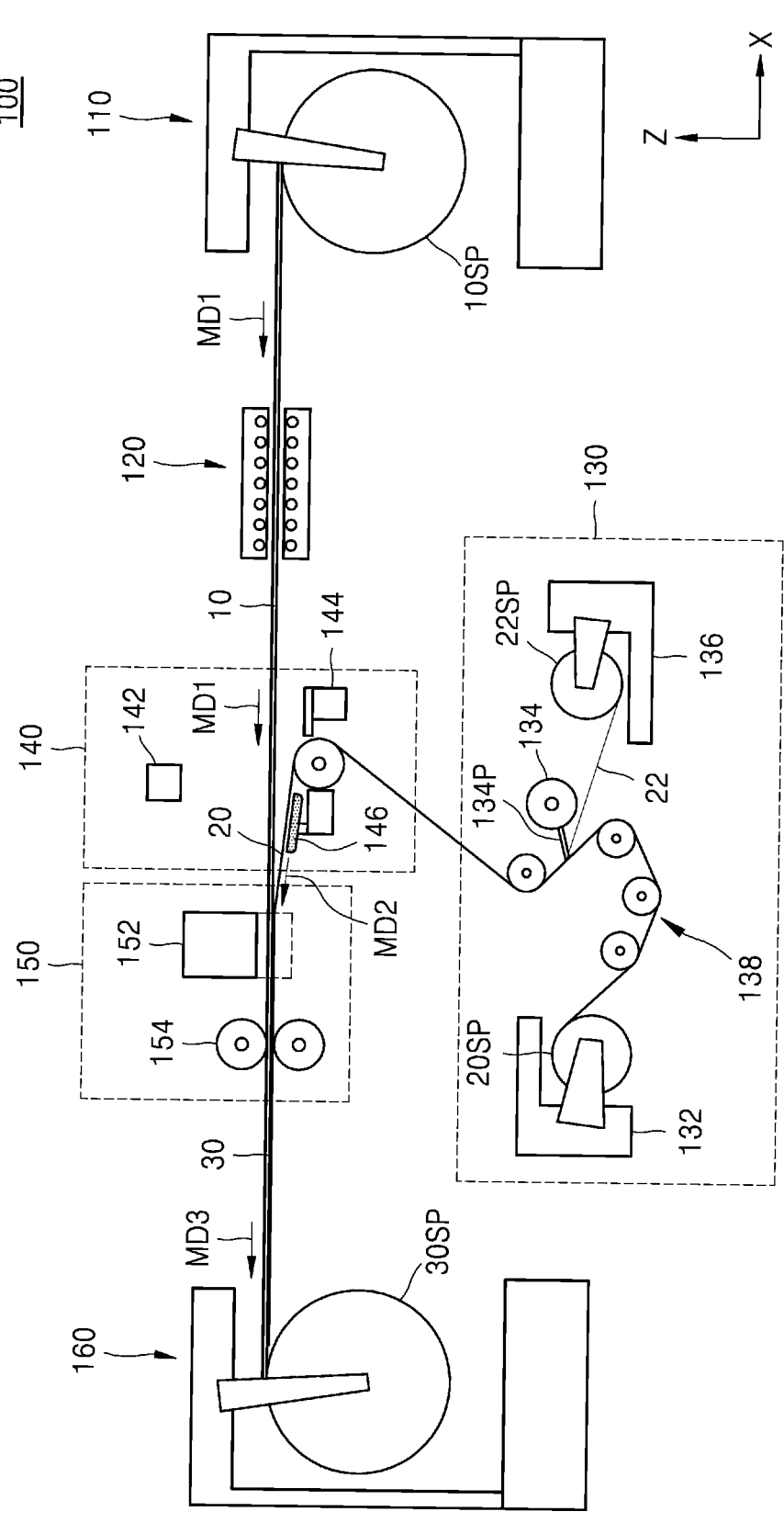
FIG. 1 is a schematic view illustrating a roll-to-roll glass lamination system according to embodiments of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments of the present disclosure will be described in more detail with reference to the accompanying drawings. The embodiments of the present disclosure may, however, be embodied in many different forms, and thus the scope of the present disclosure should not be construed as being limited to the embodiments set forth herein. The embodiments of the present disclosure are provided so that this disclosure will be thorough and complete, and will fully convey the concept of the present disclosure to those skilled in the art. In the drawings, like reference numerals may denote like elements. Furthermore, various elements and regions are schematically illustrated in the drawings. Thus, the present disclosure is not limited by the relative sizes or distances illustrated in the attached drawings.

Figure 2:
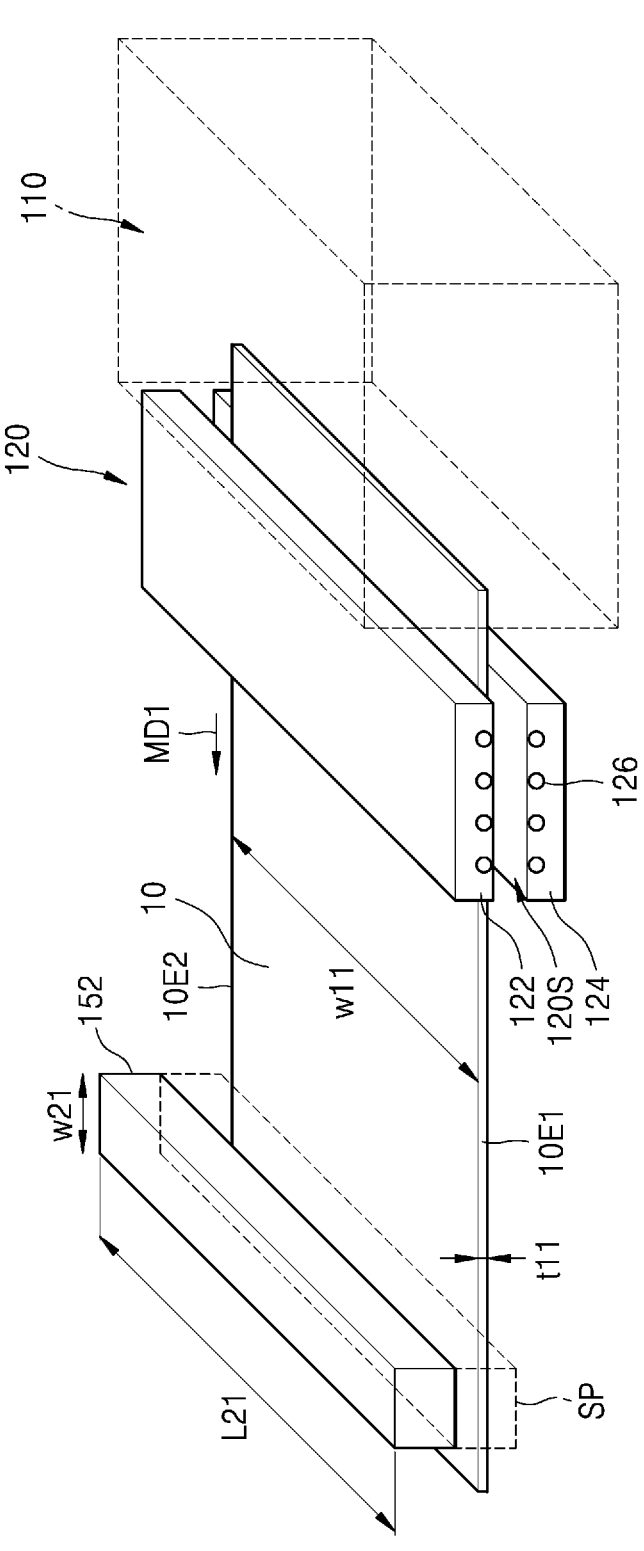
FIG. 2 is a schematic perspective view illustrating a portion of a pre-heating unit and a lamination unit of FIG. 1.
Figure 3:
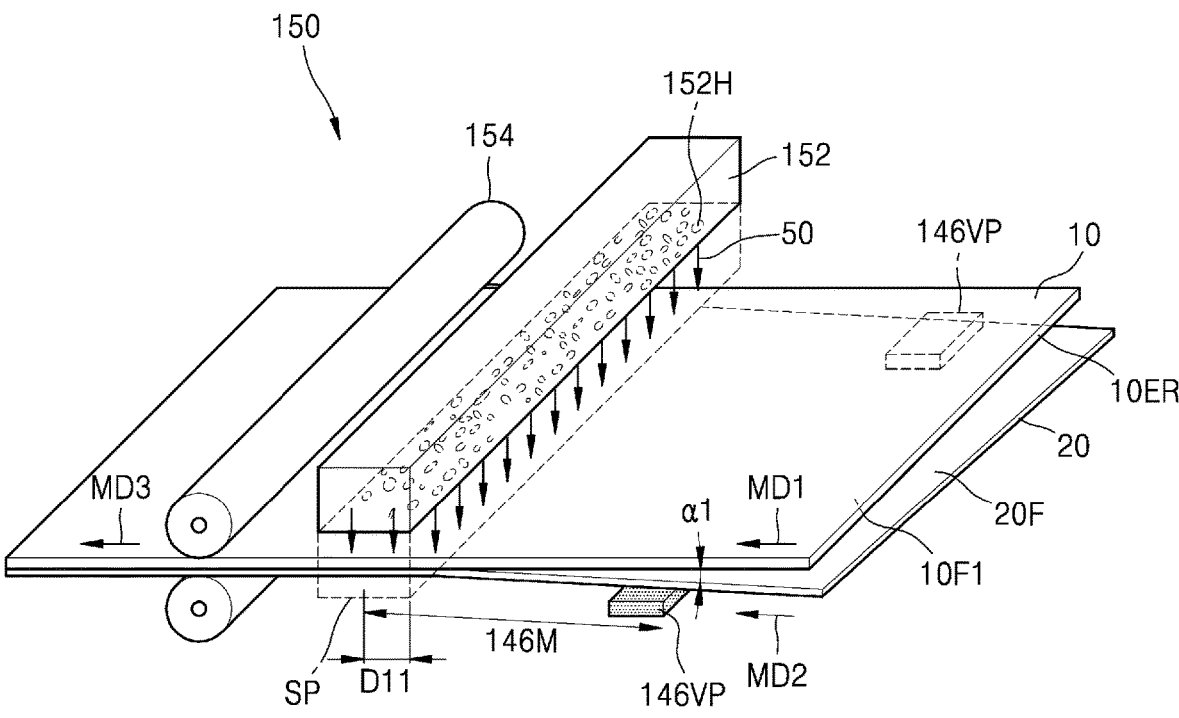
FIG. 3 is a schematic perspective view of the lamination unit of FIG. 1.
Figure 4:
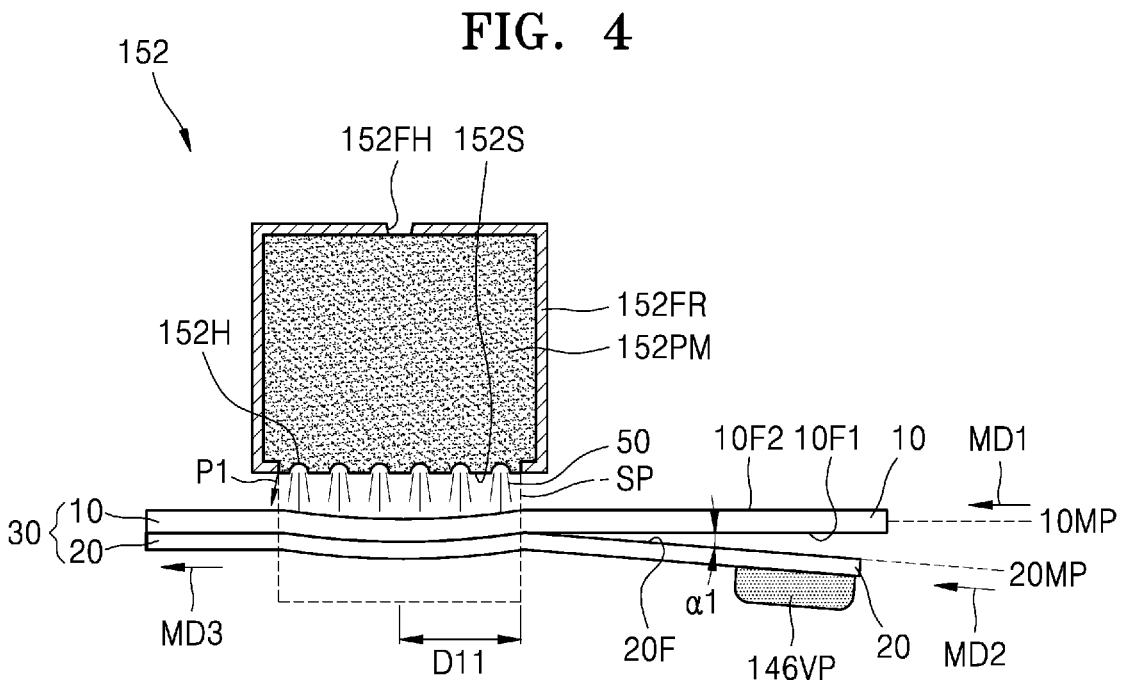
FIG. 4 is a side view illustrating an air injection device of FIG. 3.
Figure 5:
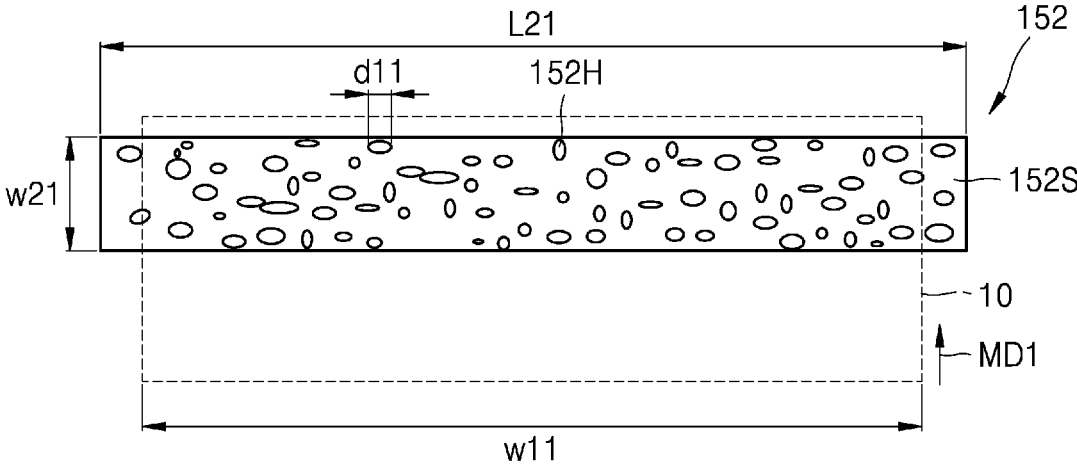
FIG. 5 is a bottom view illustrating the air injection device of FIG. 3.

FIG. 1 is a schematic view illustrating a roll-to-roll glass lamination system 100 according to embodiments of the present disclosure. FIG. 2 is a schematic perspective view illustrating a portion of a pre-heating unit 120 and a lamination unit 150 of FIG. 1. FIG. 3 is a schematic perspective view of the lamination unit 150 of FIG. 1. FIG. 4 is a side view illustrating an air injection device 152 of FIG. 3. FIG. 5 is a bottom view illustrating the air injection device 152 of FIG. 3.

Referring to FIGS. 1 through 5, the roll-to-roll glass lamination system 100 may include a glass unwinding unit 110, the pre-heating unit 120, a film feeding unit 130, a film cutting unit 140, the lamination unit 150, and a laminate winding unit 160.

The roll-to-roll glass lamination system 100 is a system that enables a continuous manufacturing process in which a glass ribbon 10 is continuously unwound from a glass roll 10SP around which the glass ribbon 10 is wound in the form of a spool, a laminate 30 is formed by laminating a film 20 on the glass ribbon 10 in a continuous manner, and the formed laminate 30 is continuously wound into a laminate roll 30SP.

The glass unwinding unit 110 may be configured to unwind the glass ribbon 10 from the glass roll 10SP to orient the glass ribbon 10 toward the lamination unit 150; for example, the glass unwinding unit 110 may continuously unwind the glass ribbon 10 from the glass roll 10SP and orient the glass ribbon 10 that is unwound, in a direction away from the glass unwinding unit 110.

In FIG. 1, a moving direction MD1 of the glass ribbon 10 unwound from the glass roll 10SP in the glass unwinding unit 100 is illustrated as an example. For example, the moving direction MD1 of the glass ribbon 10 may be a direction that is perpendicular to a width w11 of the glass ribbon 10 (e.g., a distance between a first edge 10E1 and a second edge 10E2 of the glass ribbon 10, which are opposite to each other) or a direction that is transverse to the width w11 of the glass ribbon 10. For example, the glass ribbon 10 wound around the glass roll 10SP may have a length of about 5 m to about 100 m and the width w11 of, for example, about 50 cm to about 200 cm. Also, the glass ribbon 10 may have a thickness t11 equal to or less than 250 micrometers. In some embodiments, the thickness t11 of the glass ribbon 10 may be from about 50 micrometers to about 250 micrometers, but is not limited thereto.

The pre-heating unit 120 may be arranged upstream of the lamination unit 150 in the moving direction MD1 of the glass ribbon 10 unwound from the glass unwinding unit 110 and such that the glass ribbon 10 that has passed through the pre-heating unit 120 is oriented toward the lamination unit 150.

As illustrated in FIG. 2, the pre-heating unit 120 may include an upper plate 122 and a lower plate 124, and a heating space 120S through which the glass ribbon 10 may pass may be arranged between the upper plate 122 and the lower plate 124. The pre-heating unit 120 may be configured to heat the glass ribbon 10 to a certain temperature while the glass ribbon 10 is moved in a continuous manner. The pre-heating unit 120 may heat the glass ribbon 10 passing through the heating space 120S, and after the glass ribbon 10 is laminated on the film 20, the pre-heating unit 120 may apply compressive stress to the laminate 30, thereby improving strength of the laminate 30 may be improved.

A heating member 126 may be arranged in the upper plate 122 and the lower plate 124 of the pre-heating unit 120. In some embodiments, the heating member 126 may include an IR heater that provides heat via electric resistance, but is not limited thereto. In example embodiments, the pre-heating unit 120 may apply heat to the glass ribbon 10 to a temperature in a range of 40° C. to 100° C. For example, the pre-heating unit 120 may apply heat to the glass ribbon 10 to a temperature of about 40° C. to about 100° C., including a temperature of about 40° C. to about 70° C., a temperature of about 50° C. to about 70° C., a temperature of about 60° C. to about 70° C., a temperature of about 40° C. to about 80° C., about, including a temperature of about 50° C. to about 80° C., a temperature of about 60° C. to about 80° C., a temperature of about 70° C. to about 80° C., a temperature of about 40° C. to about 60° C., and a temperature of about 50° C. to about 60° C.

At least a portion of the film feeding unit 130 may be arranged adjacent to the lamination unit 150 such that the film feeding unit 130 feeds the film 20 to the lamination unit 150. For example, the film feeding unit 130 may be arranged at a lower level than a movement path 10MP of the glass ribbon 10 in a vertical direction (i.e., Z-direction), and such that the film 20 is continuously fed into the lamination unit 150 under the glass ribbon 10. The film feeding unit 130 may include a film unwinder 132, a liner film peeling portion 134, a liner film winder 136, and a tension controlling portion 138.

In some embodiments, the film 20 may be attached to the glass ribbon 10 and act as a protective layer for preventing damage to or breakage of the glass ribbon 10 in a subsequent roll-to-roll process. In other embodiments, the film 20 may be a material layer that is attached to the glass ribbon 10 to perform various functions in a final application. For example, the film 20 may include a pressure sensitive adhesive (PSA) film, an optically clear adhesive (OCA) layer, a decoration film, a self-adhesive film, or the like. For example, according to a type and function of the film 20, a liner film 22 may be selectively adhered to the film 20. In some embodiments, a thickness of the film 20 may be from about 30 micrometers to about 200 micrometers, but is not limited thereto.

The film unwinder 132 and the liner film winder 136 may be configured to be connected to each other and rotated relative to each other. The film unwinder 132 may be configured to continuously unwind the film 20 from a film roll 20SP, and the liner film winder 136 may be configured such that, after the liner film 22 adhered to the film 20 wound around the film roll 20S is separated from the film 20, the liner film 22 is continuously wound into a film roll 22SP.

The liner film peeling portion 134 may be arranged upstream of the lamination unit 150, and may separate the liner film 22 adhered to the film 20 unwound from the film roll 20SP from the film 20 such that the film 20, an adhesive surface 20F of which is exposed, is continuously oriented toward the lamination unit 150, and the liner film 22 separated from the adhesive surface 20F of the film 20 is oriented toward the liner film winder 136 in the liner film peeling portion 134.

In example embodiments, the liner film peeling portion 134 may include a peeling plate 134P having a greater width than the entire width of the film 20. However, the present disclosure is not limited thereto, and the configuration of the liner film peeling portion 134 may be modified.

The tension controlling portion 138 may be configured to control a tension of the film 20 that is continuously fed to the lamination unit 150. The tension controlling portion 138 may further include a sensor to measure a tension of the film 20. In FIG. 1, the tension controlling portion 138 is illustrated upstream of the liner film peeling portion 134, but may also be located downstream of the liner film peeling portion 134.

In some embodiments, the film roll 20SP may include only the film 20 having the adhesive surface 20F to which the liner film 22 is not adhered, and in this case, only the film unwinder 132 and the tension controlling portion 138 may operate, and the liner film peeling portion 134 and the liner film winder 136 may not operate.

The film cutting unit 140 may be arranged upstream of the lamination unit 150 along a movement path 20MP of the film 20 from the film feeding unit 130. The film cutting unit 140 may include a sensing portion 142, a cutting portion 144, and a holding portion 146.

The sensing portion 142 may be configured to sense a position of an end portion of the glass ribbon 10. That is, the sensing portion 142 may be configured to sense a position of an end portion 10ER of the glass ribbon 10 in a direction parallel to a rotational axis of the glass roll 10SP (e.g., an X-direction). The sensing portion 142 may include, for example, an edge position control (EPC) sensor configured to sense a position of an edge of the glass ribbon 10, or a center position control (CPC) sensor configured to sense a position of a center of the glass ribbon 10.

The cutting portion 144 may be configured to cut the film 20 at a position corresponding to the position of the end portion 10ER of the glass ribbon 10. For example, the cutting portion 144 may be driven to cut the film 20 at a position corresponding to a leading edge of the glass ribbon 10 when the glass ribbon 10 starts being unwound from the glass roll 10SP such that the leading edge of the glass ribbon 10 and an edge of the film 20 to be laminated on a first surface 10F1 of the glass ribbon 10 are aligned with each other.

The holding portion 146 may be configured to hold the edge of the film 20 cut by the cutting portion 144, such that an appropriate amount of tension is maintained in the film 20 until the film 20 passes through the lamination unit 150. For example, as illustrated in FIG. 4, the holding portion 146 may include a pair of vacuum pads 146VP, and the pair of vacuum pads 146VP may hold the edge of the cut film 20 and be moved by a certain distance. FIG. 4 illustrates a movement path 146M of the pair of vacuum pads 146VP denoted by an arrow. According to other embodiments, instead of or in addition to the pair of vacuum pads 146VP, the holding portion 146 may further include any appropriate member to hold the edge of the cut film 20 and maintain an appropriate tension.

For example, the pair of vacuum pads 146VP may be moved toward the lamination unit 150 at a substantially equal speed to a movement speed of the film 20 in a moving direction that is substantially the same as a moving direction MD2 of the film 20. For example, the pair of vacuum pads 146VP may be adhered to a surface of the film 20 opposite to the adhesive surface 20F thereof, by using a vacuum method.

In example embodiments, the pair of vacuum pads 146VP may be adhered to the surface of the film 20 opposite to the adhesive surface 20F thereof until the edge of the film 20 reaches the lamination unit 150, and after the edge of the film 20 has reached the lamination unit 150, the pair of vacuum pads 146VP may be released from the surface of the film 20 opposite to the adhesive surface 20F thereof. In particular, the pair of vacuum pads 146VP may be adhered to the surface of the film 20 opposite to the adhesive surface 20F thereof until the edge of the film 20 reaches a lamination space SP of the air injection device 152, and immediately after the edge of the film 20 has reached the lamination space SP, the pair of vacuum pads 146VP may be released from the surface of the film 20 opposite to the adhesive surface 20F thereof.

In some embodiments, a movement path 146M of the pair of vacuum pads 146VP may overlap the lamination space SP of the air injection device 152 by a first distance D11, and after the edge of the film 20 has reached the lamination space SP and proceeded further by the first distance D11, the pair of vacuum pads 146VP may be released from the surface of the film 20 opposite to the adhesive surface 20F thereof. In some embodiments, the first distance D11 may be from about 0 mm to about 50 mm, but is not limited thereto.

In example embodiments, the moving direction MD1 of the glass ribbon 10 unwound from the glass roll 10SP in the glass unwinding unit 110 and the moving direction MD2 of the film 20 fed from the film feeding unit 130 may be inclined at a first inclination angle α1 with respect to each other. For example, the first inclination angle α1 may be about 0.5 degrees to about 20 degrees, but is not limited thereto.

The lamination unit 150 may be configured to generate the laminate 30 as the glass ribbon 10 and the film 20 continuously pass through the lamination unit 150 and are laminated on each other.

The lamination unit 150 may include the air injection device 152, and the lamination space SP may be defined under the air injection device 152. The glass ribbon 10 and the film 20 may be continuously fed into the lamination space SP such that they pass through the lamination space SP under the air injection device 152, and the glass ribbon 10 and the film 20 may be laminated in the lamination space SP by air 50 discharged downwards from the air injection device 152 to generate the laminate 30. For example, the glass ribbon 10 and the film 20 may be continuously fed into the lamination space SP while a second surface 10F2 of the glass ribbon 10 fed from the glass unwinding unit 110 faces the air injection device 152 and the first surface 10F1 of the glass ribbon 10 faces the adhesive surface 20F of the film 20.

As illustrated in FIGS. 4 and 5, the air injection device 152 may include a porous material plate 152PM and a frame 152FR. The porous material plate 152PM may include an air injection surface 152S on which a plurality of injection holes 152H are randomly distributed. The frame 152FM may cover an upper surface and side surfaces of the porous material plate 152PM such that the air injection surface 152S of the porous material plate 152PM is exposed to outside and faces downward, while the upper surface and the side surfaces of the porous material plate 152PM are not exposed to outside.

In example embodiments, the porous material plate 152PM may include at least one of carbon, aluminum, polyethylene resin, silica, or a metal alloy. The metal alloy may include nickel-copper alloy, nickel-chromium-iron alloy, nickel-molybdenum alloy, Duplex stainless steel, or the like.

In some embodiments, the porous material plate 152PM may include a porous carbon plate, and the porous carbon plate may include a porous material that is formed of a plurality of carbon particles that are agglomerated and sintered. For example, the porous carbon plate may have a surface smoothness or a surface roughness of about 40 to about 60 micrometers, and a sheet resistance of about $10^6$ to about $10^9$ Ω/square.

The plurality of injection holes 152H may be configured with pores in the porous material plate 152PM, and may be, for example, randomly distributed over the entire area of the air injection surface 152S. For example, each of the plurality of injection holes 152H may have various horizontal cross-sectional shapes including a regular shape such as a circle, an ellipse, a quadrangle, a rounded quadrangle, or an irregular shape including lines and curves. A size d11 of each of the plurality of injection holes 152H may refer to a largest width of each injection hole 152H with respect to the cross-section of the injection hole 152H observed from the air injection surface 152S. For example, each of the plurality of injection holes 152H may have the size d11 in a range of about 10 to about 100 micrometers.

The air injection surface 152S has a first width w21 in the moving direction MD1 of the glass ribbon 10 and a first length L21 in a direction transverse to the moving direction MD1 of the glass ribbon 10. For example, the first width w21 may be about 20 mm to about 300 mm, and the first length L21 may be about 300 mm to about 2000 mm, but are not limited thereto. For example, the first width w21 of the air injection surface 152S may be greater than the width w11 of the glass ribbon 10.

The air injection device 152 may be configured to discharge the air 50 from the air injection surface 152S through the plurality of injection holes 152H. For example, the frame 152FR may include at least one air inlet 152FH. Pressurized air is injected into the porous material plate 152PM via the at least one air inlet 152FH, the pressurized air passes through the porous material plate 152PM, and discharged to the lamination space SP from the air injection surface 152S through the plurality of injection holes 152H.

For example, the air injection device 152 may be configured such that air 50 having a first pressure P1 greater than the atmospheric pressure is discharged from the air injection surface 152S through the plurality of injection holes 152H. For example, the first pressure P1 may be 5 kg·f/cm$^2$ to 10 kg·f/cm$^2$ or about 0.5 MPa to about 1 MPa. Here, the air 50 may be pressurized air having the first pressure P1 greater than the atmospheric pressure.

As illustrated in FIG. 4, the air 50 may be injected onto the second surface 10F2 of the glass ribbon 10 through the plurality of injection holes 152H, and accordingly, the first surface 10F1 of the glass ribbon 10 and the adhesive surface 20F of the film 20 may be adhered to each other via the force of the air 50. For example, the air injection device 152 may discharge the air 50 relatively uniformly onto the second surface 10F2 of the glass ribbon 10 through the plurality of injection holes 152H randomly distributed over the entire air injection surface 152S, and accordingly, the glass ribbon 10 and the film 20 may be laminated on each other in a non-contact manner to form the laminate 30. Herein, the term 'non-contact manner' may indicate that the air injection device 152 of the lamination unit 150 does not directly contact both the glass ribbon 10 and the film 20, and that air is used to induce a contact between the glass ribbon 10 and the film 20.

In example embodiments, the movement speed of the glass ribbon 10 may be in a range from 1 feet per meter (fpm) to 50 fpm. In some examples, the movement speed of the glass ribbon 10 may be in a range from 1 fpm to 15 fpm, including 2 fpm to 10 fpm, 5 fpm to 10 fpm, 5 fpm to 15 fpm, or 10 fpm to 15 fpm. However, the movement speed of the glass ribbon 10 is not limited thereto, and may vary according to the type and thickness of the film 20, the first pressure P1 of the air 50 discharged from the air injection surface 152S, the thickness t11 of the glass ribbon 10, a temperature of the pre-heating unit 120, or the like.

As the air injection device 152 may laminate the glass ribbon 10 and the film 20 on each other in a non-contact manner through the injection of the air 50, damage or rupture, such as scratches, which may occur on the first surface 10F1 of the glass ribbon 10 when a mechanical force is applied thereto, may be prevented. In addition, as the air injection device 152 injects the air 50 having the first pressure P1 higher than the atmospheric pressure onto the glass ribbon 10, surface contamination particles that may adhere between the first surface 10F1 of the glass ribbon 10 and the adhesive surface 20F of the film 20 may be removed, and a uniform and clean interface between the glass ribbon 10 and the film 20 may be obtained. Also, as the air injection device 152 may laminate the film 20 on the glass ribbon 10 in a continuous manner, the throughput of the above lamination process may be increased.

The lamination unit 150 may selectively further include a nip roller 154 downstream of the air injection device 152. The nip roller 154 may be arranged in connection with a moving device (not shown), and installed on a movement path of the laminate 30 downstream of the air injection device 152 along a moving direction MD3 of the laminate 30 passing through the air injection device 152.

The nip roller 154 may apply a pressing pressure to the laminate 30 that has passed through the air injection device 152 (i.e., a composite of the glass ribbon 10 and the film 20 adhered to the first surface 10F1 of the glass ribbon 10).

In example embodiments, the nip roller 154 may remove air pockets (not shown) that may remain inside the laminate 30 that has passed through the air injection device 152, that is, air pockets that may remain in the interface between the glass ribbon 10 and the film 20. Alternatively, the nip roller 154 may further press the laminate 30 that has passed through the air injection device 152 such that the glass ribbon 10 and the film 20 are tightly laminated on each other.

In some examples, a heating member (not shown) may be further installed on the nip roller 154 such that the nip roller 154 may be heated to a temperature of about 30° C. to about 100° C. For example, the nip roller 154 may be heated to a temperature of about 30° C. to about 100° C., including a temperature of about 30° C. to about 70° C., a temperature of about 40° C. to about 70° C., a temperature of about 50° C. to about 70° C., a temperature of about 60° C. to about 70° C., a temperature of about 30° C. to about 80° C., a temperature of about 40° C. to about 80° C., about, including a temperature of about 50° C. to about 80° C., a temperature of about 60° C. to about 80° C., a temperature of about 70° C. to about 80° C., a temperature of about 30° C. to about 60° C., a temperature of about 40° C. to about 60° C., and a temperature of about 50° C. to about 60° C. For example, when the film 20 includes an adhesive member, heat applied to the nip roller 154 may further improve adhesion between the glass ribbon 10 and the film 20.

The laminate winding unit 160 may be arranged downstream of the lamination unit 150, and may be configured to wind, into the laminate roll 30SP, the laminate 30 that has passed through the lamination unit 150. For example, the laminate winding unit 160 may continuously wind, into the laminate roll 30SP, the laminate 30 that has passed through the lamination unit 150 (i.e., a composite of the glass ribbon 10 and the film 20 adhered to the first surface 10F1 of the glass ribbon 10).

Although not shown, a plurality of guide rolls (not shown) may be arranged at certain intervals between the glass unwinding unit 110 and the laminate winding unit 160 to assist in controlling the tension when the glass ribbon 10 is unwound or the laminate 30 is wound. A tension sensor and a tension control device may be attached to the plurality of guide rolls such that the glass ribbon 10 or the laminate 30 that is being rolled may be rolled with a constant tension.

The roll-to-roll glass lamination system 100 according to the above-described example embodiments may be configured such that the glass ribbon 10 and the film 20 fed into the lamination unit 150 in a continuous manner are laminated in a non-contact manner by the air pressure injected from the air injection device 152. Thus, damage to and breakage of the glass ribbon 10 that may occur when processing a glass roll by using a roll-to-roll process may be prevented. In addition, various types of films 20 required to be adhered to the glass ribbon 10 according to various applications may be laminated on the glass ribbon 10 with a high yield.

Figure 6:
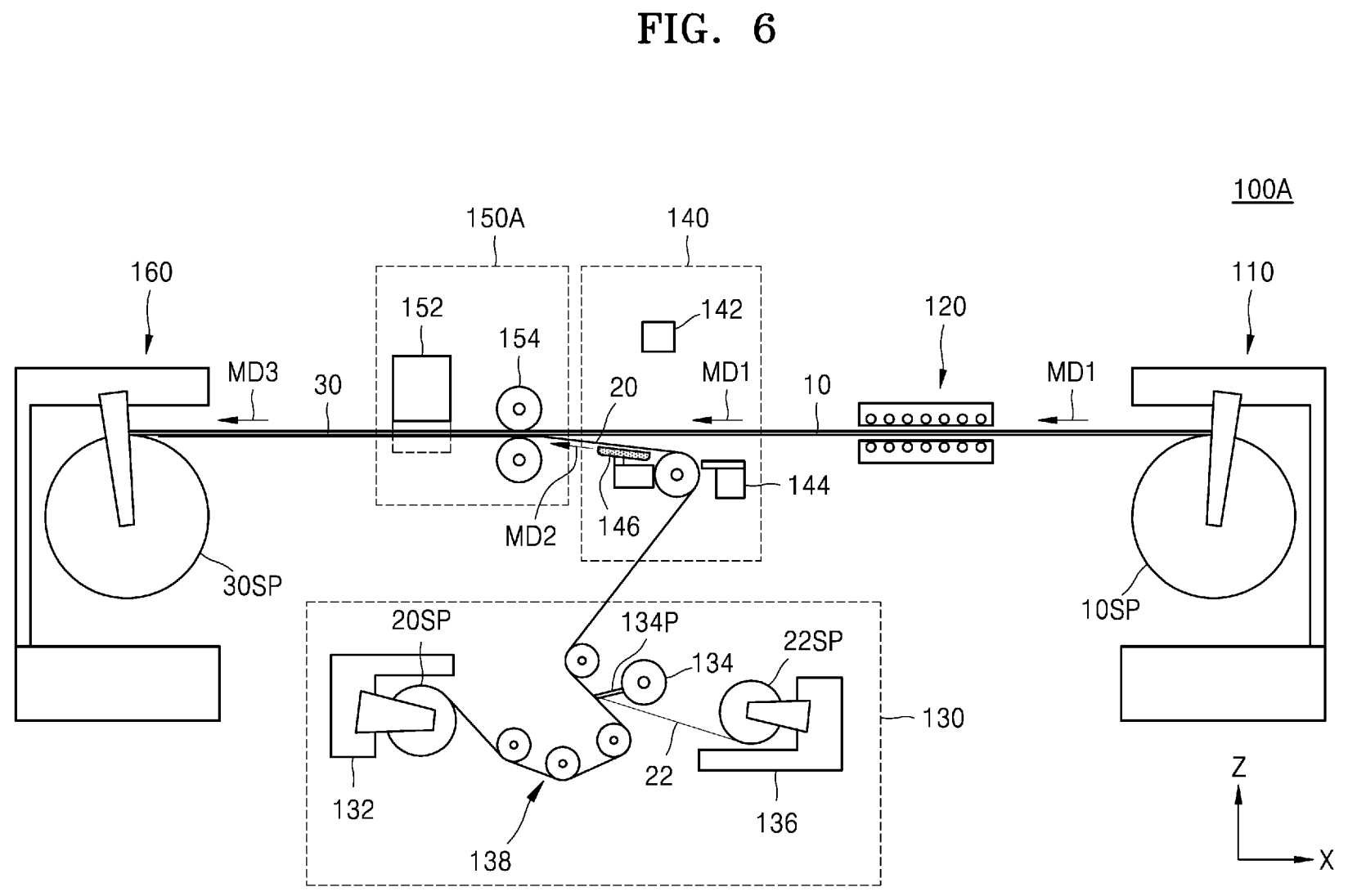
Figure 7:
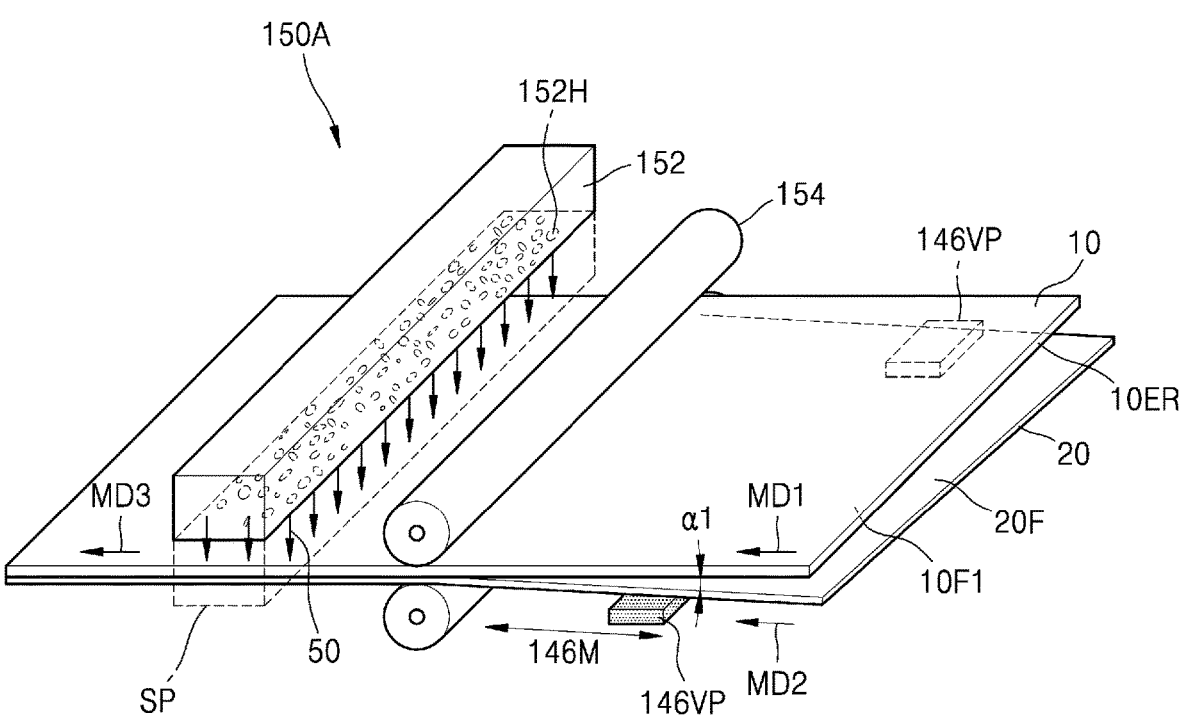
FIG. 7 is a schematic perspective view of a lamination unit of FIG. 6.

FIG. 6 is a schematic view illustrating a roll-to-roll glass lamination system 100A according to other embodiments. FIG. 7 is a schematic perspective view of a lamination unit 150A of FIG. 6.

Referring to FIGS. 6 and 7, the lamination unit 150A may include the nip roller 154 arranged upstream along the movement path 10MP of the glass ribbon 10 and the air injection device 152 downstream thereof.

The nip roller 154 may contact the second surface 10F2 of the glass ribbon 10 and the surface of the film 20 opposite to the adhesive surface 20F thereof such that the first surface 10F1 of the glass ribbon 10 and the adhesive surface 20F of the film 20 are temporarily fixed to each other. The nip roller 154 may temporarily fix the glass ribbon 10 and the film 20 such that the second surface 10F2 of the glass ribbon 10 and the adhesive surface 20F of the film 20 may be aligned in a required direction.

In some embodiments, while temporarily fixing the glass ribbon 10 and the film 20, the nip roller 154 may apply heat to the film 20 to improve the adhesion of the film 20. In some examples, a heating member (not shown) may be further installed on the nip roller 154 such that the nip roller 154 may be heated to a temperature of about 30° C. to about 100° C. For example, the nip roller 154 may be heated to a temperature of about 30° C. to about 100° C., including a temperature of about 30° C. to about 70° C., a temperature of about 40° C. to about 70° C., a temperature of about 50° C. to about 70° C., a temperature of about 60° C. to about 70° C., a temperature of about 30° C. to about 80° C., a temperature of about 40° C. to about 80° C., about, including a temperature of about 50° C. to about 80° C., a temperature of about 60° C. to about 80° C., a temperature of about 70° C. to about 80° C., a temperature of about 30° C. to about 60° C., a temperature of about 40° C. to about 60° C., and a temperature of about 50° C. to about 60° C.

The pair of vacuum pads 146VP may be moved toward the lamination unit 150A at a substantially equal movement speed to the movement speed of the film 20 in a moving direction that is substantially the same as the moving direction MD2 of the film 20. In example embodiments, the pair of vacuum pads 146VP may be adhered to the surface of the film 20 opposite the adhesive surface 20F thereof until immediately before the edge of the film 20 reaches the lamination unit 150A, and may be released from the surface of the film 20 opposite to the adhesive surface 20F thereof immediately before the edge of the film 20 reaches the lamination unit 150A. In particular, the pair of vacuum pads 146VP may be adhered to the surface of the film 20 opposite to the adhesive surface 20F thereof until immediately before the edge of the film 20 reaches the nip roller 154, and may be released from the surface of the film 20 opposite to the adhesive surface 20F thereof immediately before the edge of the film 20 reaches the nip roller 154.

The air injection device 152 may be arranged downstream of the nip roller 154, and may be configured to form the laminate 30 by injecting the air 50 onto a temporary fixture of the glass ribbon 10 and the film 20 (i.e., the glass ribbon 10 and the film 20 that is temporarily fixed to the first surface 10F1 of the glass ribbon 10), which has passed through the nip roller 154. The air injection device 152 may downwardly inject the air 50 having the first pressure P1 greater than the atmospheric pressure, through the plurality of injection holes 152H from the air injection surface 152S, such that the glass ribbon 10 and the film 20 are laminated on each other. For the features of the air injection device 152, the description provided with reference to FIGS. 1 to 4 may be referred to.

Figure 8:
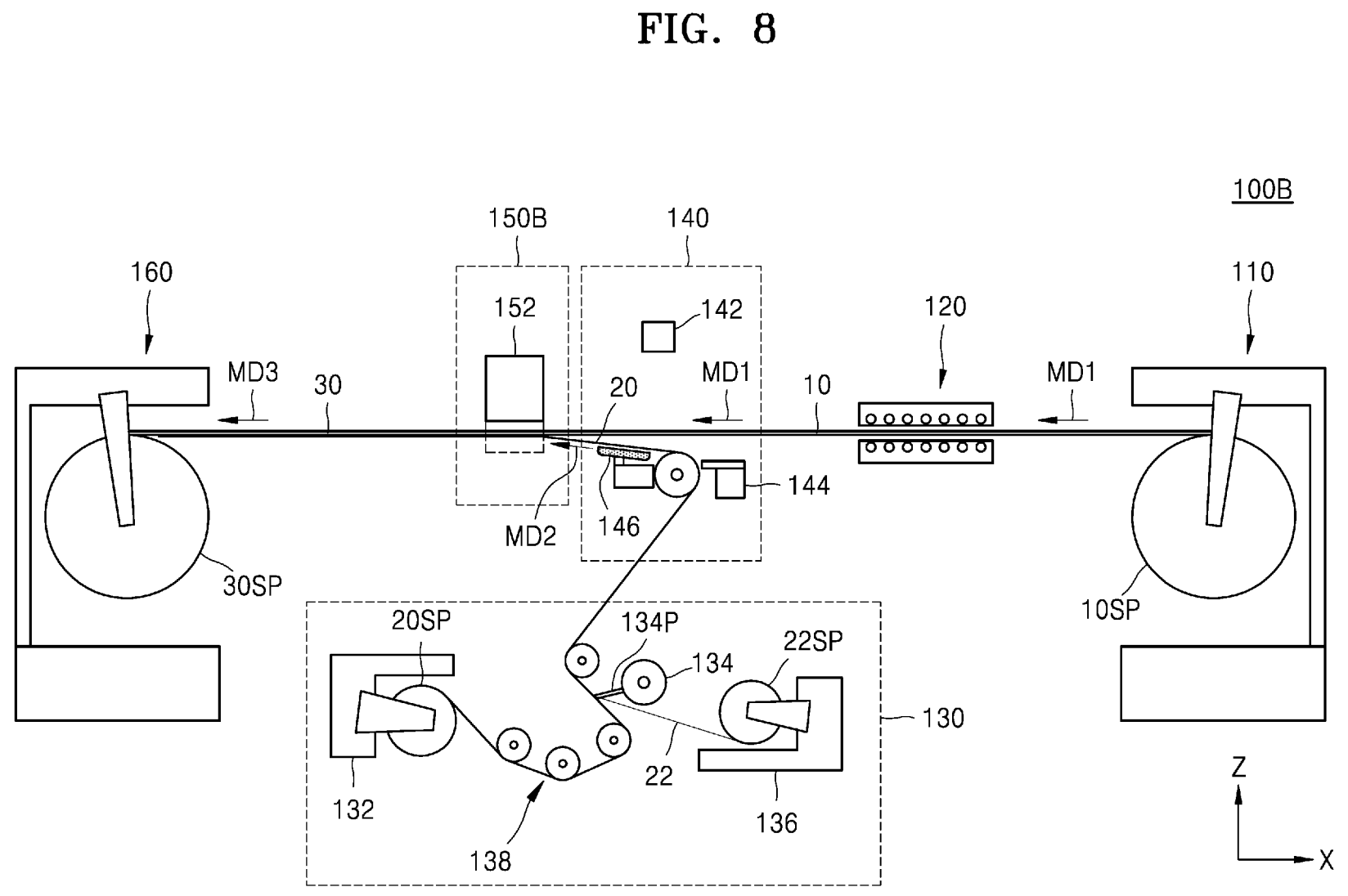
Figure 9:
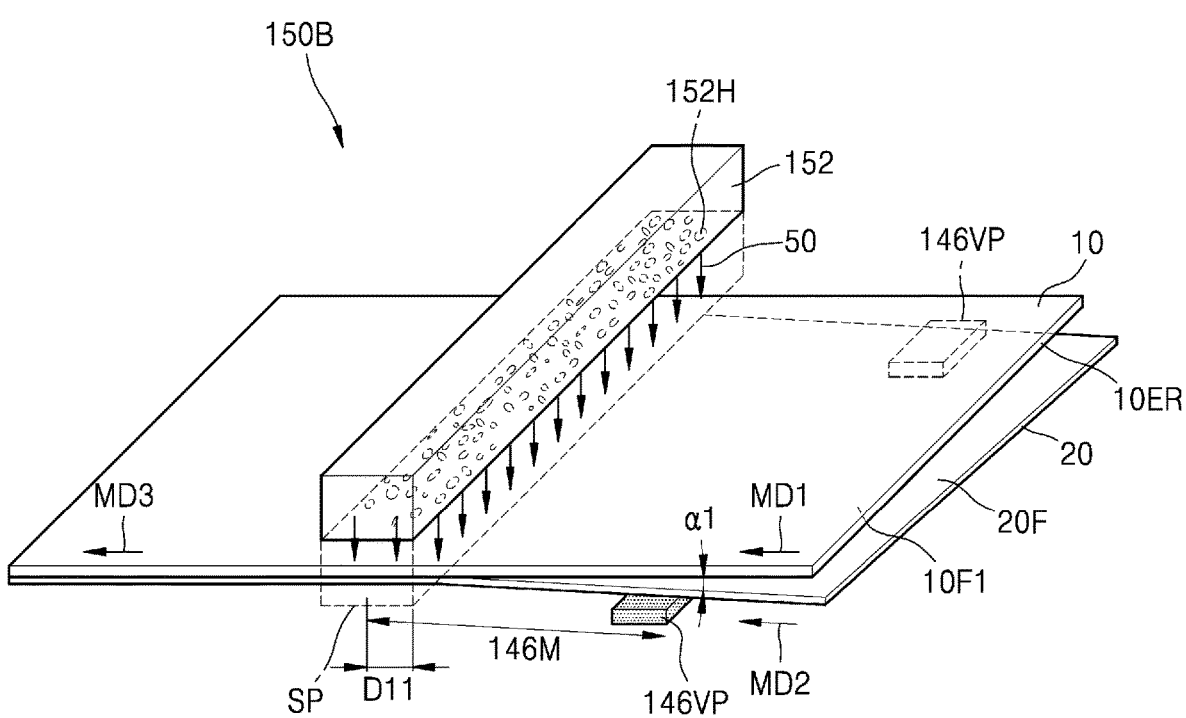
FIG. 9 is a schematic perspective view of a lamination unit of FIG. 8.

FIG. 8 is a schematic view illustrating a roll-to-roll glass lamination system 100B according to other embodiments. FIG. 9 is a schematic perspective view of a lamination unit 150B of FIG. 8.

Referring to FIGS. 8 and 9, the lamination unit 150B does not include the nip roller 154 and may include only the air injection device 152.

The air injection device 152 may downwardly inject the air 50 having the first pressure P1 greater than the atmospheric pressure from the air injection surface 152S through the plurality of injection holes 152H, such that the glass ribbon 10 and the film 20 that are continuously unwound from the glass unwinding unit 110 and have passed through the pre-heating unit 120 are laminated on each other. For the features of the air injection device 152, the description provided with reference to FIGS. 1 to 5 may be referred to.

Figure 10:
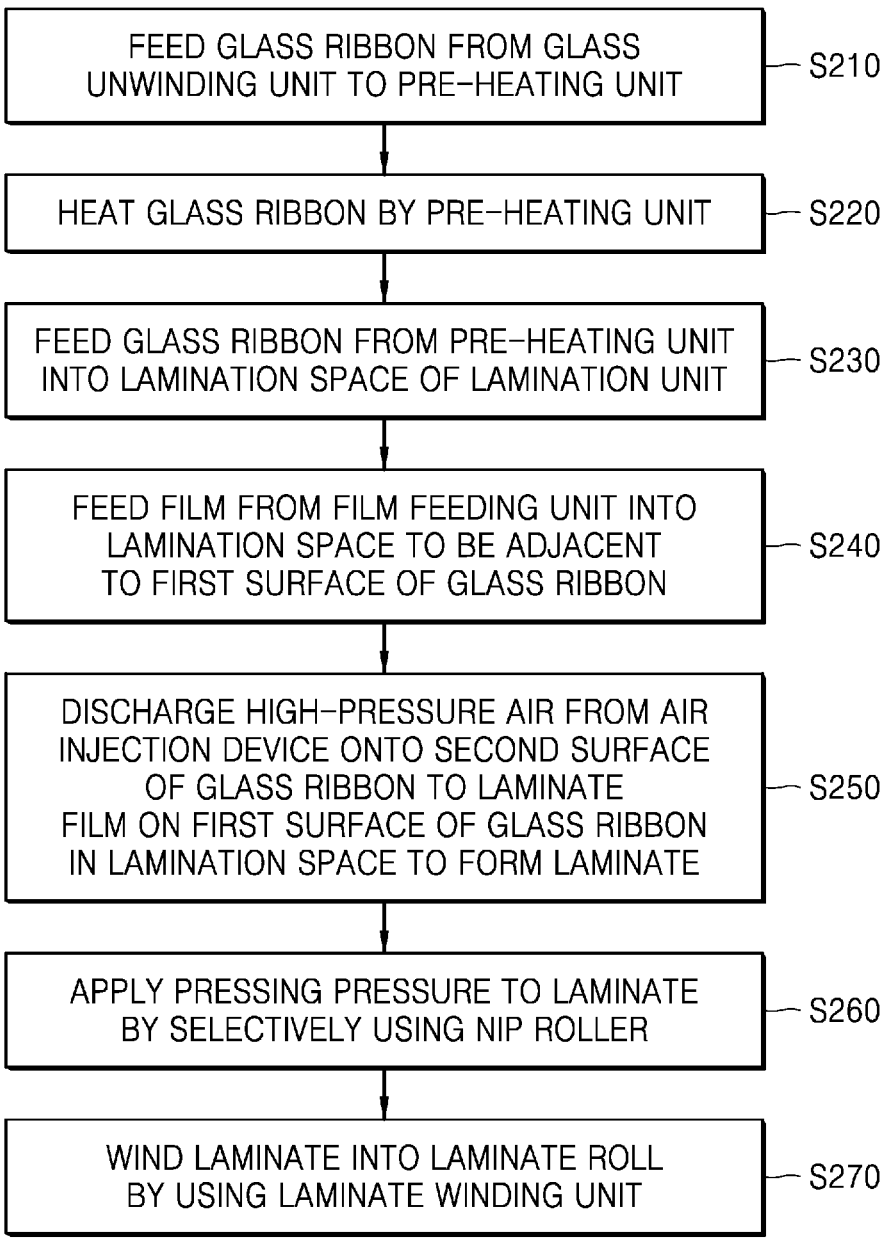
FIG. 10 illustrates a flowchart of a roll-to-roll glass lamination method according to embodiments.

FIG. 10 illustrates a flowchart of a roll-to-roll glass lamination method according to embodiments. FIG. 10 may be a roll-to-roll glass lamination method using the roll-to-roll glass lamination system 100 described with reference to FIGS. 1 to 5.

Referring to FIG. 10 together with FIGS. 1 to 5, in a first operation (S210), the glass ribbon 10 may be fed from the glass unwinding unit 110 to the pre-heating unit 120.

The glass ribbon 10 may include, for example, silicate glass, borosilicate glass, aluminosilicate glass, boroaluminosilicate glass, or a combination thereof, each including or not including an alkali element(s). The glass ribbon 10 may be, for example, Willow® glass available from Corning Incorporated.

In some embodiments, the glass ribbon 10 may be provided by unwinding the glass roll 10SP in the glass unwinding unit 110. For example, the glass ribbon 10 may be continuously unwound from the glass unwinding unit 110 along the moving direction MD1 and provided to the pre-heating unit 120.

In a second operation (S220), the glass ribbon 10 may be heated by the pre-heating unit 120. The operation of heating the glass ribbon 10 may be performed while the glass ribbon 10 continuously passes through the heating space 120S of the pre-heating unit 120. For example, the pre-heating unit 120 may apply heat to the glass ribbon 10 to a temperature in a range of about 40° C. to about 100° C.

After the pre-heating unit 120 heats the glass ribbon 10 passing through the heating space 120S to laminate the glass ribbon 10 on the film 20, the pre-heating unit 120 may apply compressive stress to the laminate 30, and accordingly, a strength of the laminate 30 may be improved.

In a third operation (S230), the glass ribbon 10 may be fed from the pre-heating unit 120 into the lamination space SP of the lamination unit 150.

In example embodiments, the glass ribbon 10 may be continuously fed from the pre-heating unit 120 to the lamination space SP under the air injection device 152 of the lamination unit 150. For example, the movement speed of the glass ribbon 10 may be in a range from 1 fpm to 50 fpm. In some examples, the movement speed of the glass ribbon 10 may be in a range from 1 fpm to 15 fpm, including 2 fpm to 10 fpm, 5 fpm to 10 fpm, 5 fpm to 15 fpm, or 10 fpm to 15 fpm.

In a fourth operation (S240), the film 20 may fed from the film feeding unit 130 into the lamination space 150 to be adjacent to the first surface 10F1 of the glass ribbon 10. For example, the film 20 may be fed into the lamination space 150 while being inclined at the first inclination angle α1 from the first surface 10F1 of the glass ribbon 10. For example, the first inclination angle α1 may be about 0.5 degrees to about 20 degrees, but is not limited thereto.

For example, the film feeding unit 130 may be arranged at a lower level than the movement path 10MP of the glass ribbon 10 in a vertical direction (i.e., Z-direction) and such that the film 20 is continuously fed into the lamination space SP under the glass ribbon 10.

The film feeding unit 130 may include the film unwinder 132, the liner film peeling portion 134, the liner film winder 136, and the tension controlling portion 138. The film unwinder 132 may continuously unwind the film 20 from the film roll 20SP, and the liner film peeling portion 134 may separate the liner film 22 adhered to the film 20 unwound from the film roll 20SP, from the film 20, such that the film 20, the adhesive surface 20F of which is exposed, may be continuously oriented to the lamination unit 150. Also, the liner film winder 136 may continuously wind the liner film 22 separated from the adhesive surface 20F of the film 20, into the liner film roll 22SP.

Also in the fourth operation (S240), the sensing portion 142 included in the film cutting portion 140 may detect a position of an end portion 10ER of the glass ribbon 10, and the cutting portion 144 may cut the film 20 at a position corresponding to the position of the end portion 10ER of the glass ribbon 10.

The holding portion 146 may be configured to hold the edge of the film 20 cut by the cutting portion 144 to maintain a tension of the film 20 until the film 20 passes through the lamination unit 150. For example, the pair of vacuum pads 146VP may hold the edge of the film 20, and until the edge of the film 20 reaches the lamination space SP or after the edge of the film 20 has reached the same, the pair of vacuum pads 146VP may be moved by the first distance D11 together with the film 20 along the movement path 146M of the pair of vacuum pads 146VP.

In a fifth operation (S250), the air 50 may be discharged from the air injection device 152 onto the second surface 10F2 of the glass ribbon 10 to laminate the film 20 on the first surface 10F1 of the glass ribbon 10 in the lamination space SP to form the laminate 30.

In example embodiments, the air injection device 152 may include the porous material plate 152PM, and the air 50 may be uniformly discharged from the air injection surface 152S of the porous material plate 152PM through the plurality of injection holes 152H. The air injection device 152 may be configured such that the air 50 having the first pressure P1 greater than the atmospheric pressure is discharged downwards (substantially in a vertical direction (Z-direction)) from the air injection surface 152S toward the second surface 10F2 of the glass ribbon 10. For example, the first pressure P1 may be 5 kg·f/cm² to 10 kg·f/cm² or about 0.5 MPa to about 1 MPa.

In the fifth operation (S250), according to the force of the air 50 discharged from the air injection device 152, the first surface 10F1 of the glass ribbon 10 and the adhesive surface 20F of the film 20 may be adhered to each other, and the glass ribbon 10 and the film 20 may be laminated on each other in a non-contact manner, that is, by using a pressing method according to the force of the air 50, to form the laminate 30.

In a sixth operation (S260), a pressing pressure may be applied to the laminate 30 by selectively using the nip roller 154. The nip roller 154 may remove air pockets (not shown) that may remain inside the laminate 30 that has passed through the air injection device 152, that is, air pockets that may remain at the interface between the glass ribbon 10 and the film 20. Alternatively, the nip roller 154 may further press the laminate 30 that has passed through the air injection device 152 such that the glass ribbon 10 and the film 20 are tightly laminated on each other.

In some examples, the nip roller 154 may be heated to a temperature of about 30° C. to about 100° C. For example, when the film 20 includes an adhesive member, heat applied to the nip roller 154 may further improve adhesion between the glass ribbon 10 and the film 20.

In a seventh operation (S270), the laminate 30 may be wound into the laminate roll 30SP by using the laminate winding unit 160. For example, the laminate winding unit 160 may continuously wind the laminate 30 that has passed through the lamination unit 150, into the laminate roll 30SP.

The laminate 30 may be formed by performing the above-described roll-to-roll glass lamination method by using the roll-to-roll glass lamination system 100 according to the example embodiments. According to the roll-to-roll glass lamination method described above, the glass ribbon 10 and the film 20 fed into the lamination unit 150 in a continuous manner may be laminated in a non-contact manner by the air pressure injected from the air injection device 152. Thus, damage to and breakage of the glass ribbon 10 that may occur when processing a glass roll by using a roll-to-roll process may be prevented. In addition, various types of films 20 required to be adhered to the glass ribbon 10 according to various applications may be laminated on the glass ribbon 10 with a high yield.

While the method in which the glass ribbon 10 and the film 20 pass through the nip roller 154 after passing through the air injection device 152 is described with reference to FIG. 10, alternatively, when using the roll-to-roll glass lamination system 100A described with reference to FIGS. 6 and 7, the glass ribbon 10 and the film 20 may first pass through the nip roller 154 such that they are temporarily fixed with respect to each other, and then may pass through the air injection device 152 to form the laminate 30.

Also, while the method in which the glass ribbon 10 and the film 20 pass through the nip roller 154 after they have passed through the air injection device 152 is described with reference to FIG. 10, alternatively, when using the roll-to-roll glass lamination system 100B described with reference to FIGS. 8 and 9, after the laminate 30 is formed as the glass ribbon 10 and the film 20 have passed through the air injection device 152, they may not pass through the nip roller 154, but may be wound into the laminate roll 30SP in the laminate winding unit 160.

The glass ribbon and the film fed into the lamination unit in a continuous manner may be laminated in a non-contact manner by the air pressure injected from the air injection device. Thus, damage to and breakage of the glass ribbon that may occur when processing a glass roll by using a roll-to-roll process may be prevented. In addition, various types of films required to be adhered to the glass ribbon according to various applications may be laminated on the glass ribbon with a high yield.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A roll-to-roll glass lamination system comprising:
   a glass unwinding unit configured to unwind a glass ribbon from a glass roll, the glass ribbon having a first surface and a second surface;

a film feeding unit configured to unwind the film from a film roll;

a lamination unit configured to laminate the film on the first surface of the glass ribbon to create a laminate, the lamination unit including an air injection device configured to blow air onto the second surface of the glass ribbon in a lamination space such that the first surface of the glass ribbon is in contact with the film; and a laminate winding unit configured to wind the laminate into a laminate roll, wherein:

the air injection device is configured such that air having a predetermined pressure is injected downward through a plurality of injection holes; and the lamination unit is configured such that the glass ribbon passes through the lamination space under the air injection device while the second surface of the glass ribbon faces the air injection device and the first surface of the glass ribbon faces the film.

2. The roll-to-roll glass lamination system of claim 1, wherein the air injection device includes an air injection surface on which the plurality of injection holes are randomly distributed, and wherein the air injection surface has a first width along a moving direction of the glass ribbon, the air injection surface has a first length along a direction transverse to the moving direction of the glass ribbon, the first width is in a range from 20 mm to 300 mm, and the first length is in a range from 300 mm to 2000 mm.

3. The roll-to-roll glass lamination system of claim 1, wherein the lamination unit is configured such that a first pressure higher than atmospheric pressure is applied onto the second surface of the glass ribbon over an entire area of the air injection surface within the lamination space.

4. The roll-to-roll glass lamination system of claim 1, wherein each of the plurality of injection holes has a size in the range of 10 to 100 micrometers.

5. The roll-to-roll glass lamination system of claim 1, wherein the air injection device includes a porous material plate, and the porous material plate includes at least one from carbon, aluminum, polyethylene resin, silica, and a metal alloy.

6. The roll-to-roll glass lamination system of claim 1, wherein the lamination unit further includes a nip roller detachably arranged downstream of the air injection device along a movement path of the glass ribbon, and the lamination unit is configured such that the laminate passes through the nip roller.

7. The roll-to-roll glass lamination system of claim 1, wherein the film feeding unit includes:

a film unwinder configured to unwind the film from the film roll;

a liner film peeling portion configured to separate a liner film adhered to an adhesive surface of the film from the film; and a liner film winder configured to wind the liner film separated from the film in the liner film peeling portion.

8. The roll-to-roll glass lamination system of claim 1, further comprising a film cutting unit arranged upstream of the lamination unit along a movement path of the film supplied to the lamination unit, the film cutting unit including:

a sensing portion configured to sense a position of an end portion of the glass ribbon;

a cutting portion configured to cut the film at a position corresponding to the position of the end portion of the glass ribbon; and a holding portion configured to hold both ends of the cut film to maintain a tension of the cut film until an end portion of the film approaches the end portion of the glass ribbon.

9. The roll-to-roll glass lamination system of claim 1, further comprising a pre-heating unit arranged upstream of the lamination unit along a movement path of the glass ribbon and configured to heat the glass ribbon to a predetermined temperature.

10. The roll-to-roll glass lamination system of claim 1, wherein the film includes a pressure-sensitive adhesive (PSA) film, an optically clear adhesive (OCA) film, a decoration film, a self-adhesive film, or a combination thereof.

11. A roll-to-roll glass lamination system for lamination of a film onto a glass ribbon, comprising:

a glass unwinding unit configured to unwind the glass ribbon from an initial glass roll;

a film feeding unit configured to unwind the film from a film roll;

a lamination unit configured to laminate the film on a first surface of the glass ribbon in a non-contact manner to create a laminate, the lamination unit including an air injection device configured to blow an pressurized air onto a second surface of the glass ribbon, opposite to the first surface of the glass ribbon, in a lamination space;

a laminate winding unit configured to wind the laminate into a laminate roll; and a nip roller detachably arranged downstream of the air injection device along a movement path of the glass ribbon, wherein the lamination unit is configured such that the laminate passes through the nip roller.

12. The roll-to-roll glass lamination system of claim 11, wherein the air injection device is configured such that the pressurized air is injected downward through a plurality of injection holes, and wherein the lamination unit is configured such that the film entering the lamination space is positioned below the first surface of the glass ribbon.

13. The roll-to-roll glass lamination system of claim 12, wherein the air injection device includes an air injection surface on which the plurality of injection holes are randomly distributed, and wherein the air injection surface has a first width along a moving direction of the glass ribbon, the air injection surface has a first length along a direction transverse to the moving direction of the glass ribbon, the first width is in a range from 20 mm to 300 mm, and the first length is in a range from 300 mm to 2000 mm.

14. The roll-to-roll glass lamination system of claim 11, wherein the film feeding unit includes:

a film unwinder configured to unwind the film from the film roll;

a liner film peeling portion configured to separate a liner film adhered to an adhesive surface of the film from the film; and a liner film winder configured to wind the liner film separated from the film in the liner film peeling portion.

15. The roll-to-roll glass lamination system claim 11, further comprising a film cutting unit arranged upstream of the lamination unit along a movement path of the film supplied to the lamination unit, the film cutting unit including:

a sensing portion configured to sense a position of an end portion of the glass ribbon;

a cutting portion configured to cut the film at a position corresponding to the position of the end portion of the glass ribbon; and a holding portion configured to hold both ends of the cut film to maintain a tension of the cut film until an end portion of the film enters the lamination space.

16. The roll-to-roll glass lamination system of claim 11, further comprising a pre-heating unit arranged upstream of the lamination unit along a movement path of the glass ribbon and configured to heat the glass ribbon to a temperature in a range of 40° C. to 100° C.

17. A method of laminating a film on a glass ribbon using the roll-to-roll glass lamination system of claim 1, comprising:

feeding the glass ribbon from the glass unwinding unit to the lamination space;

feeding the film from the film feeding unit to the lamination space, the film being arranged adjacent to the first surface of the glass ribbon;

laminating the film on the first surface of the glass ribbon within the lamination space to create a laminate, by injecting a pressurized air onto the second surface of the glass ribbon from the air injection device; and winding the laminate into a laminate roll using the laminate winding unit.

18. The method of claim 17, further comprising:

subsequent to the laminating the film on the first surface of the glass ribbon, applying a pressing pressure to the laminate using the nip roller.

\* \* \* \* \*